United States Patent [19]

DeMar

[11] Patent Number: 4,763,256

[45] Date of Patent: Aug. 9, 1988

[54] SYSTEM TO DETECT AND BYPASS INOPERATIVE GAME FEATURES IN AN AMUSEMENT DEVICE

[75] Inventor: Lawrence E. DeMar, Chicago, Ill.

[73] Assignee: Williams Electronics Games, Inc., Chicago, Ill.

[21] Appl. No.: 909,180

[22] Filed: Sep. 19, 1986

[51] Int. Cl.[4] .................. G06F 15/44; G08B 21/00; A63F 7/02; A63F 7/22
[52] U.S. Cl. .................. 364/410; 273/121 A
[58] Field of Search .................. 364/410; 273/121 A; 340/644; 273/1 E

[56] References Cited

U.S. PATENT DOCUMENTS 4,058,316  11/1977  Miller .................. 273/121 A

FOREIGN PATENT DOCUMENTS 1141861  2/1983  Canada .................. 273/121 A

OTHER PUBLICATIONS

"Computerized Pin Table Launched by Micro", *Coin Slot*, Dec. 6, 1975, 28.

Seninsky, F., "Rating the 'Mr. & Mrs.'", *Play Meter*, Oct. 1982, 56, 58.

Powers, B. M., "Bally's Electronic Flippers with Sound", *Play Meter*, Nov. 1978, 94–96.

Kinney, B. W., "Simplify Volume Product Design with Single-Chip Microcomputers", *EDN*, vol. 23, No. 7, Apr. 5, 1978, 97–103.

*Primary Examiner*—Jerry Smith
*Assistant Examiner*—Clark A. Jablon
*Attorney, Agent, or Firm*—Jones, Day, Reavis & Pogue

[57] ABSTRACT

A microprocessor system monitors operation of an amusement device, such as a pinball machine, to detect inoperative switches and the like associated with game features, such as drop targets. Inoperability is assumed if the switch has not been activated after a statistically significant number of game plays. When an inoperative switch is detected, an audio/visual announcement is generated to advise the operator that repair is necessary. In addition, the microprocessor alters the game rule operation to compensate for the inoperative switches to avoid player dissatisfaction. The processor system includes a microprocessor and associated memory and interface devices for connecting the game elements to the processor system.

10 Claims, 4 Drawing Sheets

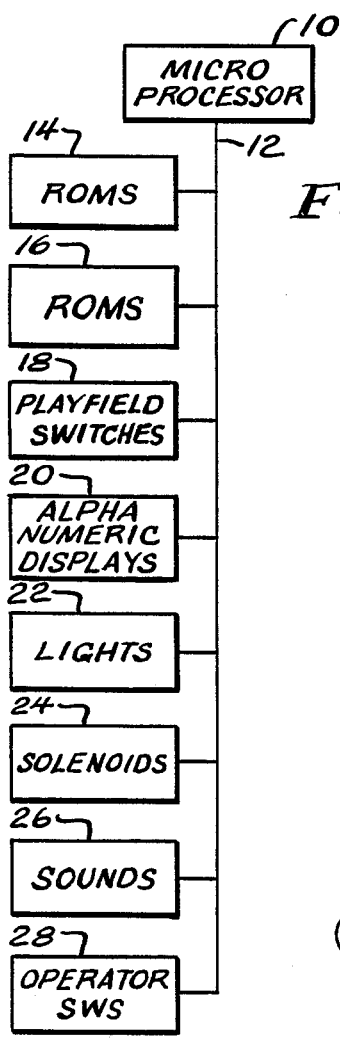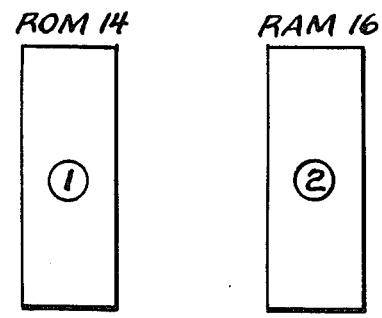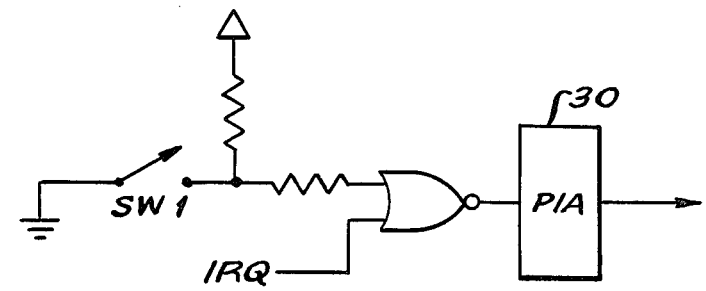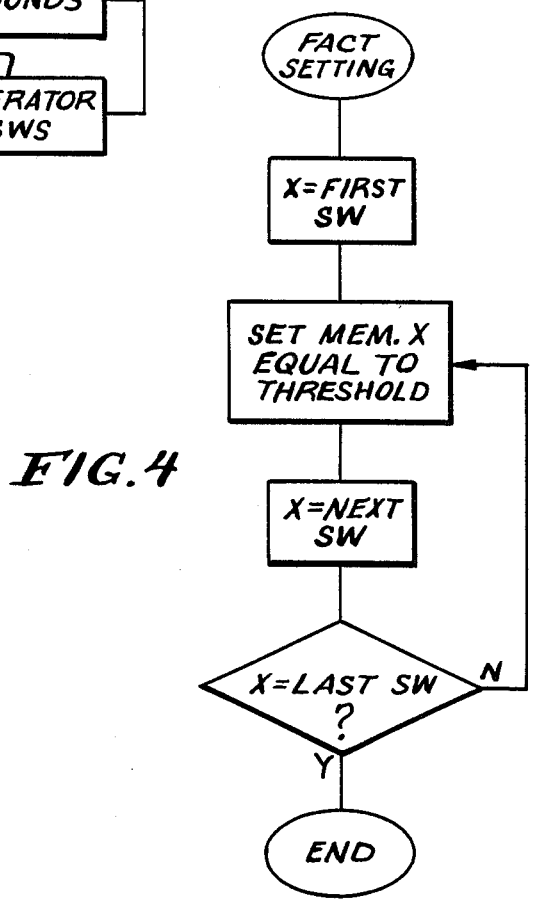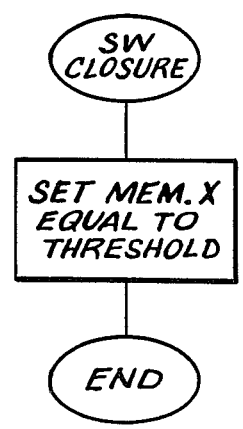

SYSTEM TO DETECT AND BYPASS INOPERATIVE GAME FEATURES IN AN AMUSEMENT DEVICE

BACKGROUND OF THE INVENTION

This invention relates to coin operated amusement devices, such as pinball machines, video games and the like. More specifically, it relates to the commercial type of device usually found in game arcades, restaurants and other commercial establishments. Such devices usually include a computer control system which, responsive to player inputs, operates the game. Typically the control system will detect switch closures caused by hitting targets, etc., and responsive thereto update player scores and award replays (free games). The computer control system usually includes a microprocessor, associated memory and interface devices for connecting the processor system to the switches, lights, solenoids and other associated devices (including, in the case of video games, a CRT).

Such devices are constructed to withstand severe operating conditions as they are often abused by players and receive little or no regular maintenance. When equipment failures occur they are frequently associated with playfield features which the game player must strike with the pinball. When such failure occurs as, for example, a switch associated with a target becoming inoperative, there are at least two problems. First, the game player can no longer meet all of the objectives which the rules of the game require as, for example, knocking down all three targets in a row in order to obtain a free ball or a bonus score. This will quickly reduce the incentive for players to continue patronizing a game until the problem is repaired and, indeed, may cause sufficient antagonism that players may be induced to cause further damage to the game. When such malfunctions occur, it is important to record that information and advise the game operator (usually an arcade owner) of the defect so that the game may be repaired. Although present pinball games permit the operator to test each switch individually, there is, at present, no provision to automatically detect inoperative switches and to modify game play, where possible, to permit the player to continue meeting the game objectives. Such ability assures continued revenue from the game until it can be repaired while at the same time positively alerting the game operator that sevice is required to restore the game to its intended operating condition.

It is accordingly an object of the present invention to provide a system to detect inoperative switches by monitoring of switch closure activity.

It is a further object of the invention to maintain a list of such inoperative switches and to automatically alert the game operator thereof each time the game is turned on or during diagnostic routines performed by the operator or a technician.

It is a further object of the invention to provide a system capable of alerting game operation to compensate for any detected switches which are inoperative to allow a player to meet the game objectives thereby assuring continued viability of the game until repairs can be effected.

Other objects and advantages of the invention will be apparent from the remaining portion of the specification.

SUMMARY OF THE INVENTION

The present invention employs a microprocessor based system to monitor switch closure activity of the game features maintained on the playfield and which are intended to be actuated during game play. When the system detects a switch which should be generating switch closures but is not for a period of time to be statistically significant, it determines that that switch is inoperative. Such switch is then identified to an operator each time that the game is powered up or during diagnostics and the game rules implemented as part of the computer systems program are altered to compensate for the inoperative switches. For example, if one target of a three target bank is determined to be inoperative due to the associated switch failing to make contact the system will "give" the target associated with the broken switch to the player so that by simply making the remaining two targets the player may obtain the bonus award associated with the effort.

BRIEF DESCRIPTION OF THE DRAWINGS

FIG. 1 is a block diagram of a computer control system suitable for use in the present invention.

FIG. 2 is a schematic illustrating the manner in which an operator may interrogate the processor system to obtain data relating to switch operation.

FIG. 3 is a representation of the memory locations in which data useful in the present invention is stored.

FIGS. 4 through 14 are flow diagrams useful in explaining the operation of the invention.

DETAILED DESCRIPTION

Figure 6:
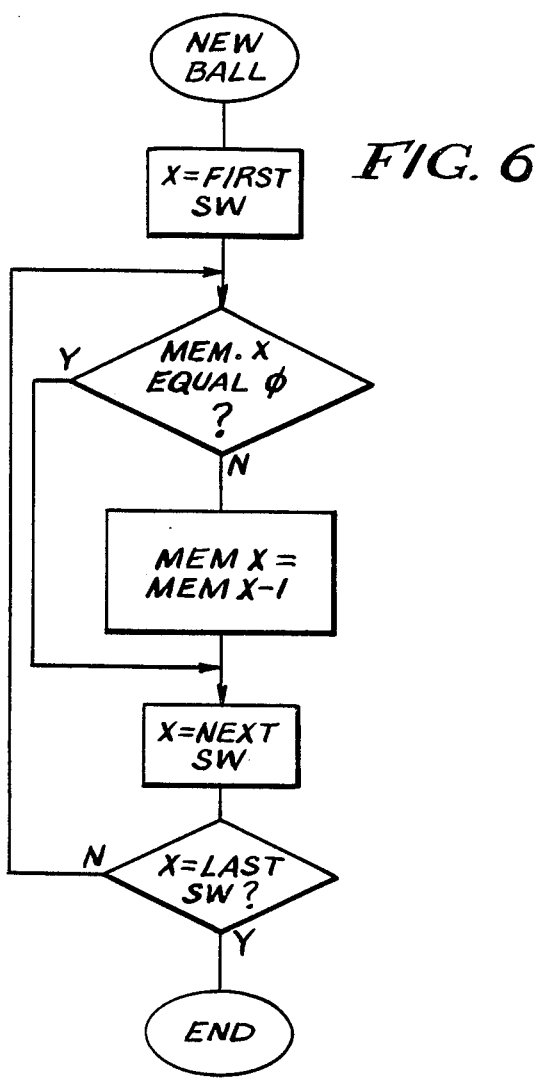
Figure 7:
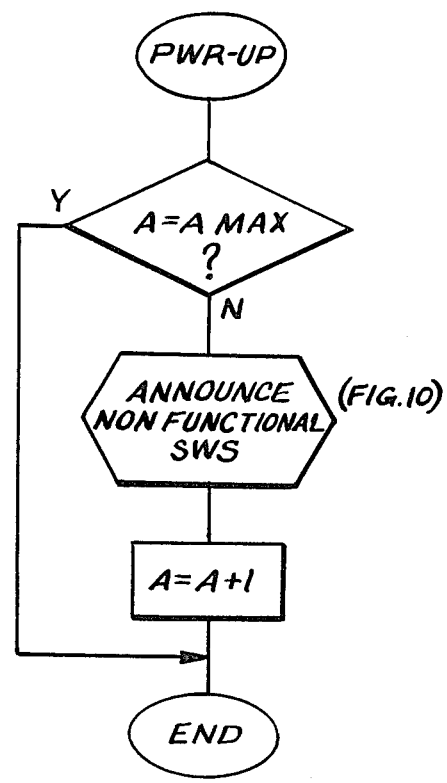
Figure 8:
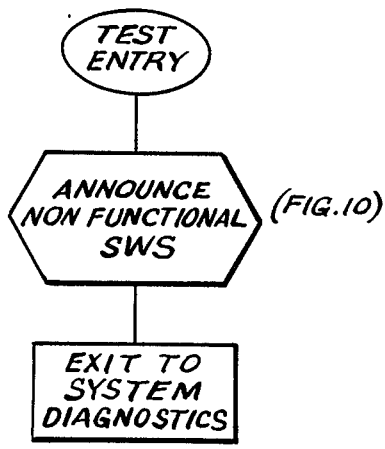
Figure 9:
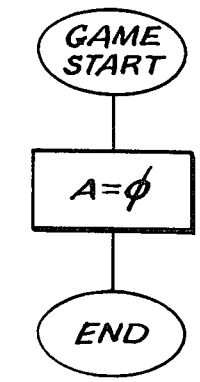

Referring to FIG. 1, there is disclosed a typical microprocessor system for use in a coin operated amusement device, such as a pinball machine. There are many microprocessor systems that can be used for this purpose as, for example, the Motorola 6800 series. The miroprocessor 10 is interfaced via a bus 12 to various memory elements including one or more ROMs 14 (read only memories), RAMs 16 (random access memories), playfield switches 18 (in the case of pinball machines), alpha numeric displays 20, lights 22, solenoids 24 and sound circuits 26. In addition, a set of operator switches 28 are usually provided for the purpose of permitting the operator (game owner or owner of the establishment in which the game is located) to input information to the system, such as the number of free play levels, the point values required for each free play level and to obtain data from the processor system, such as revenue received, number of games played, and test information concerning the operational conditions of the amusement device.

The memories are connected directly to the bus 12 in a manner well known by those skilled in the art. Typically the remaining devices, such as switches, displays, lights, etc., are connected to the processor bus by means of an interface device such as a PIA (peripheral interface adapter). Such device lets the processor communicate with the various elements, for example, to interrogate a switch matrix to detect closures or to operate numerical displays to display player scores.

Referring to FIG. 2, a typical arrangement for the operator switches 28 is illustrated. In the present invention the FIG. 2 circuit permits the operator to provide certain information to the control system and to obtain data therefrom. The operator switches, such as switch SW1, are usually located in a locked portion of the game not accessible by the game players. SW1 is connected through appropriate level and logic circuitry to a PIA 30 which, in turn, interfaces with the microprocessor via the bus 12. Additional operator switches may be provided as necessary. Such operator switches and their operation are well known in the art and will not be described in detail here. Basically the operator activates the switches in a specified sequence placing the system in a desired mode such as: test mode to check the circuitry; an accounting mode to check game play and revenue; or a setting mode in which manual replay levels and other game features may be selected, enabled or disabled.

FIG. 3 is a diagram useful in understanding the operation of the present invention. It is a schematic representation of the memories in which data is stored. Rather than constituting a discrete memory device, FIG. 3 represents locations within a specified type of memory. Thus, memory 1 represents the memory locations within ROM 14. Memory 2 represents memory locations in a battery backed up RAM in which current data concerning the switches to be maintained is stored.

The balance of this specification will describe a series of flow diagrams (FIGS. 4 through 14) which indicate the manner of operation of the control system according to the present invention. The flow diagrams can be implemented in many different program forms, the implementation depending upon the type of processor system employed. It will be readily apparent to those skilled in the art how to implement the function specified in the various flow diagrams for any specific computer system.

FACTORY SETTING AND SWITCH CLOSURE ROUTINES

FIG. 4 shows the flow diagram for a routine suitable for use with the system of FIG. 1 each time that a game is first played on location and powered up. For any particular game there are a discrete number of switches to be monitored by the system. For each switch to be monitored there is reserved in one of the memories (memory 2 in FIG. 3) a byte in which to store the state of each switch. At factory setting installation and each time that a valid closure of a switch occurs, the value is initialized to some predetermined value. The value selected, referred to hereafter as the threshold value, should be a number which is large enough that the switch associated therewith will almost certainly be actuated before the value can be decremented to zero. As will be explained, the value in memory is decremented each time a new ball is put into play. Thus, if the threshold value is large enough, a statistically accurate determination can be made as to the operability of a switch by monitoring whether or not a switch closure has occurred within a fixed number of balls in play. To exemplify the present invention the value 60 will be assumed for threshold. Thus, when the game is first played on location the factory setting routine sets the memory locations for every switch to be monitored equal to a threshold value of 60 as shown in FIG. 4.

Each time a new ball is played the state byte for the switches are decremented and should the state byte reach zero, the switch is considered to be inoperative. If before the state byte reaches zero a valid closure of the switch occurs, the state byte is reset to the threshold value. This operation is shown in the flow diagram of FIG. 5 labelled swith closure.

NEW BALL ROUTINE

As mentioned, each time a new ball is put into play, the routine shown in FIG. 6 is called to decrement the switch value stored in the memory to zero. A branch avoids decrementing the value below zero. After the memories have been updated by the new ball routine, there are three routines (FIGS. 7, 8 and 9) which are called to announce any switch determined to be inoperative.

ANNOUNCE INOPERATIVE SWITCHES

At power up and upon entry to the diagnostic test system by the game operator, via the FIG. 2 operator switches, the game will report inoperative switches (those whose state byte is zero). The FIG. 7 routine is performed each time that the power to the game is turned on as, for example, when an arcade opens in the morning. The routine first checks to see how many times the announcement routine has been called. If the maximum (a max) has been reached, no announcement is made. This is desirable to discourage game players from turning a game on and off to watch the announcement sequence which typically will involve lights, sounds, and the actuation of solenoids and knockers. Each time that the game is actually played the value of A is reset to zero by the routine shown in FIG. 9.

Figure 10:
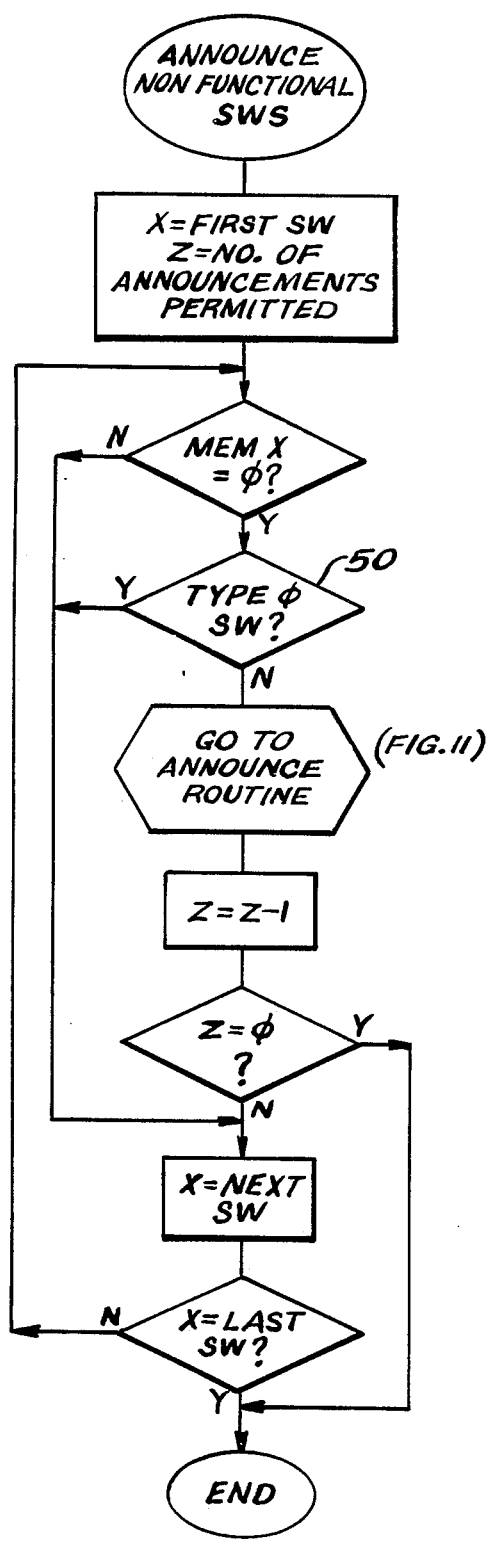

Assuming that the announcement is to be made, nonfunctional switches are announced by calling the routine shown in FIG. 10 to be described hereafter. The value of A is then incremented and the FIG. 7 routine ends.

A similar routine is provided for the operator selected diagnostics. When requested by the operator via the operator switches which are not accessible to game players, the system will announce all nonfunctional switches and then permit entry to the typical game diagnostic and accounting software employed in modern amusement devices.

ANNOUNCE NONFUNCTIONAL SWITCHES

FIG. 10 shows the routine which announces nonfunctional switches. Because some switches are closed only rarely, it is desirable to exclude some switches from the monitoring and announcement functions. For this purpose a table is maintained in ROM memory 1 indicating the status or type of each of the switches for which announcements should not be made. For descriptive purposes these may be designated as type zero switches. The program, upon detecting an apparently inoperative type zero switch will not make an announcement. This feature is shown in FIG. 10 at 50. When the announce nonfunctional switches routine is called, a counter Z is set equal to the maximum number of announcements permitted. The routine then sequences through each swtich memory location to determine which locations have been decremented to zero indicating an inoperative switch. Type zero switches are then excluded and the first inoperative switch detected causes a branch to the announce routine shown in FIG. 11. Thereafter the value of Z is decremented and a test is made to see if Z equals zero. If so, no further announcements are made. If not, the FIG. 10 routine continues interrogating switch memories to locate additional inoperative switches which are then announced. The value of Z is selected to avoid excessive announcements. Typically a value of three will be used so that up to three nonfunctional swithes may be announced.

ANNOUNCE ROUTINE

Figure 11:
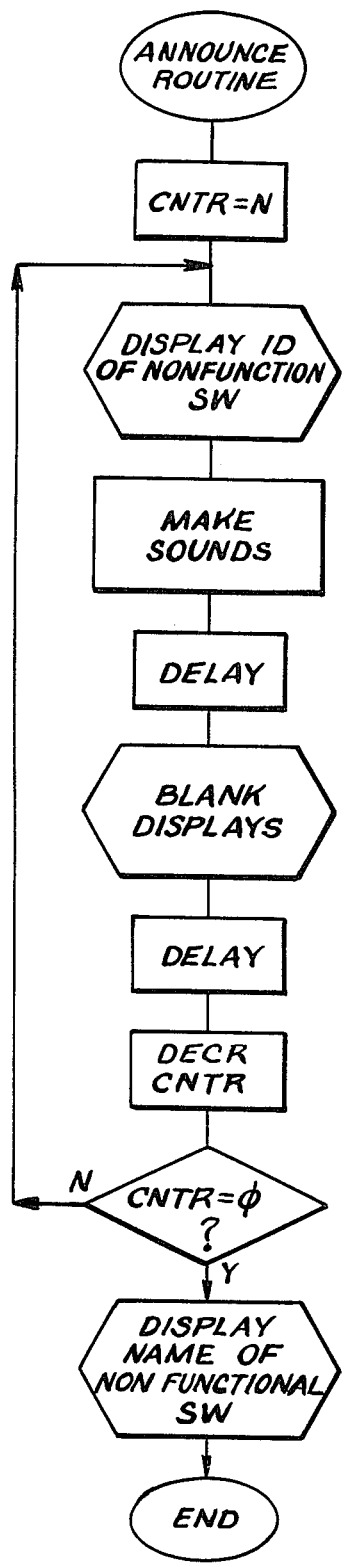

The FIG. 11 routine is called each time that the FIG. 10 routine detects an inoperative switch which is permitted to be announced. The routine sets a counter equal to an arbitraty value N. Next the switch number or other identification of the nonfunctional switch is provided on the alpha numeric displays and/or other display devices associated with the game so that the operator, by reference to the sevice manual, may quickly identify the type of switch which is inoperative. Simultaneously with the display of the switch ID, various solenoids associated with the game are actuated briefly to alert an operator that the game does, in fact, require attention and possibly needs to be taken out of service until repairs are made. The displays are then blanked after a slight delay, the counter value N is decremented and the routine repeats until the counter reaches zero. Having thus gained the attention of the operator, the alpha numerics display the name of the nonfunctional switch. The routine then terminates.

GAME ALTERATION ROUTINES

Figure 12:
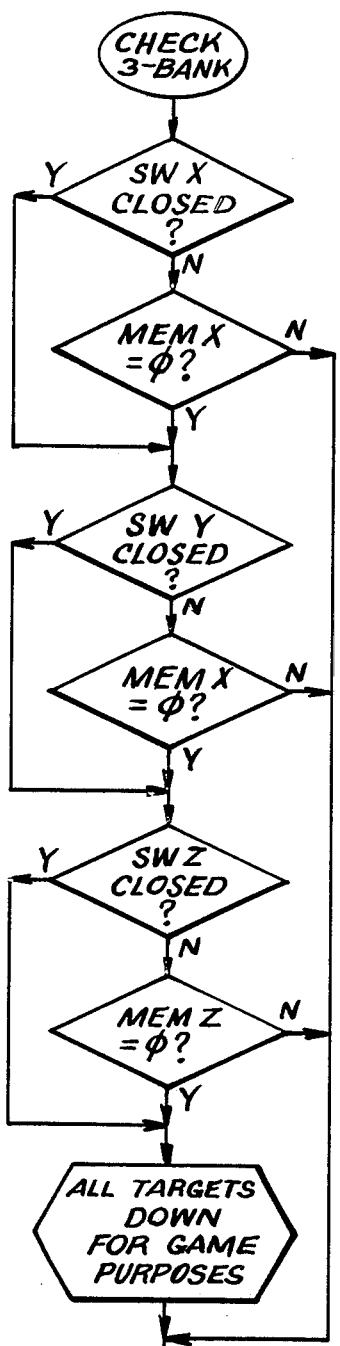
Figure 13:
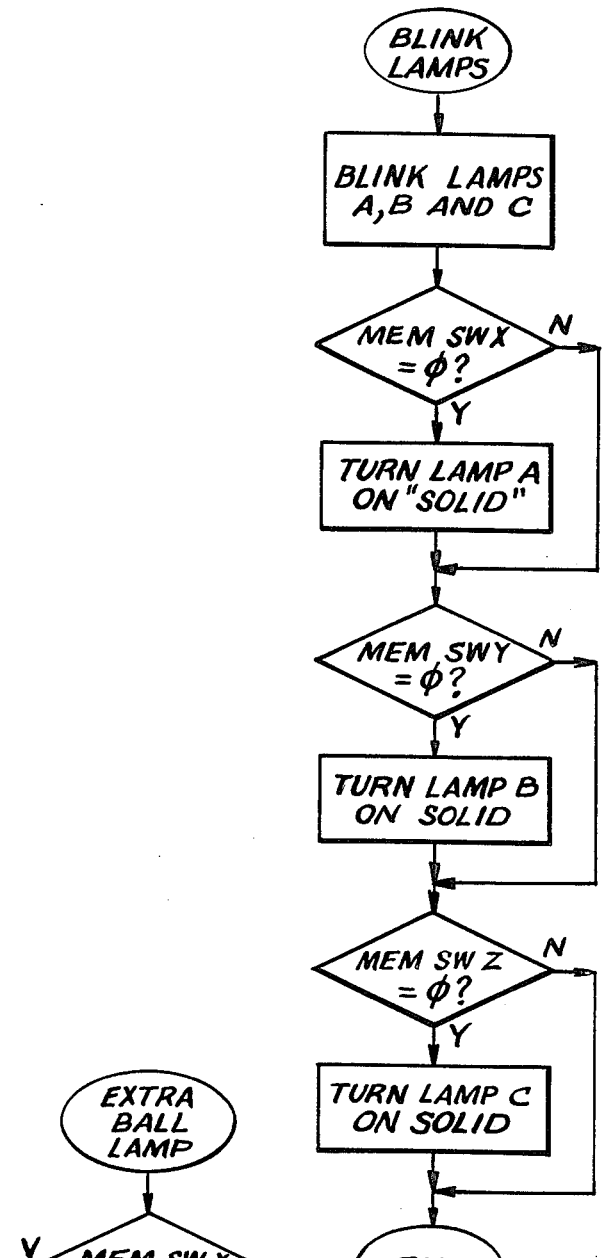
Figure 14:
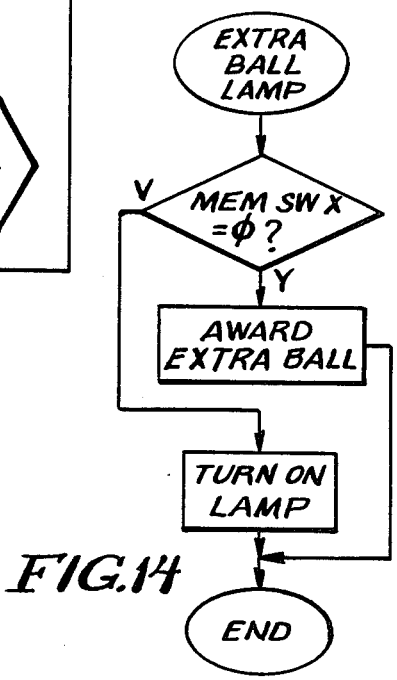

A final aspect of the present invention is the ability to temporarily "play around" an inoperative switch so that the game can be maintained in service. This is accomplished by compensating for inoperative switches to allow a player to meet his objectives. In general, the alterations in game operation must be determined on a switch by switch basis depending on how the involved switch affects game play. FIGS. 12, 13 and 14 illustrate three techniques for "playing around" different types of switch failures. FIG. 12 deals with the failure of one or more switches in a three bank target area. FIG. 13 deals with the situation where typically three lamps associated with stand up targets must be turned on when the associated target is hit. FIG. 14 deals with the award of an extra ball by hitting a target associated with an extra ball lamp.

Referring to FIG. 12, the flow chart checks for all targets down on a three bank target with associated switches X, Y and Z. This routine is called by the computer control system whenever a ball is in play and any of the three target switches closes. In sequence, it checks each of the three switches X, Y and Z to see if it was closed. If so, no further action is taken. If not, it checks to see if the switch has been deemed inoperative because its memory value equals zero. If, for example, two of the three switches have been closed indicating that the player has struck the associated target but the third switch has not been closed but is deemed inoperative, the FIG. 12 routine will signal the scoring portion of the computer system to treat the three bank targets as having been made and award whatever appropriate bonuses, replay scores or other awards are dictated by the rules fo the game. As can be seen from an inspection fo FIG. 12, in order for the routine to treat all tagrets as down, it is necessary that a switch be inoperative or, if operative, that it be met by having its associated targets struck by a pinball. FIG. 13 relates to a similar situation involving lamps which are changed from blinking to solid when a pinball strikes an associated target and switch assembly. The routine is called to set the lamps to blinking at the start of a desired play sequence. The routine starts all three lamps A, B and C blinking and then tests the switch memory location for each lamp to see if the associated switch (X, Y and Z, respectively) is deemed inoperative. Any switch which is deemed inoperative causes the associated lamp to be immediately turned on "solid" thereby advising the player that he need not make the target having the inopertative switch. Thus the player knows that he must make only targets associated with operative switches in order to receive his bonus. Because this slightly degrades the skill level required, most players will not object to having an easier time making such bonuses at least on a temporary basis.

Finally, the routine in FIG. 14, called each time that the rules of the game provide an opportunity for the player to earn an extra ball, performs similarly to the FIG. 13 routine. The memory associated with the extra ball lamp is interrogated. If the switch is inoperative the extra ball is immediately awarded to the player and the "shoot again" lamp turned on signalling that the award has been made. Thus the player is not subjected to the frustration of making a target entitling him to an extra ball but not receiving it. Such frustration often results in players attempting to damage the equipment or refusing to play the game because of the ill will generated.

While I have shown and described embodiments of the invention, it will be understood that this description and illustrations are offered merely by way of example, and that the invention is to be limited in scope only as to the appended claims.

I claim:

1. A control system for detecting and bypassing inoperative game features of an amusement device comprising:
   (a) memory means for storing values, each value representative of the operative state of one game feature;
   (b) means for periodically altering said representative values to cause them to reach a final value indicative of an inoperative state;
   (c) means for detecting operation of each of said game features;
   (d) means for initializing the corresponding representative value stored in said memory means to prevent it from reaching said final value if a game feature operates during game play; and
   (e) means responsive to a game feature having a representative value equal to said final value for bypassing said game feature to permit game players to obtain the award normally associated with successfully operating said game feature.

2. A control system according to claim 1 wherein said system further includes: means responsive to said bypassing means for producing an audio/visual announcement of the existence of game features determined to be inoperative.

3. A control system according to claim 1 wherein said amusement device is a pinball game and said game features include switches located on the playfield of said game and intended to be operated by player manipulation of one or more pinballs.

4. A control system according to claim 3 wherein said initializing means initializes the corresponding representative value each time a playfield switch is actuated.

5. A control system according to claim 3 wherein said altering means alters the representative values for all switches each time a new ball is put into play.

6. A method for detecting and bypassing inoperative game features in an amusement device comprising the steps of:
   (a) storing in a memory values representative of the operative state of each game feature to be detected;

(b) periodically altering said representative values to cause them to reach a final value indicative of an inoperative state;
(c) detecting operation of each of said game features;
(d) initializing the corresponding representative value stored in said memory each time a game feature is operated during game play to prevent it from reaching said final value;
(e) bypassing a game feature if its representative value equals said final value to permit game players to obtain the award normally associated with successfully operating said game feature.

7. The method according to claim 6 further including:
(f) announcing the existence of game features which have been bypassed.

8. The method according to claim 6 wherein said amusement device is a pinball game and said game features include switches located on the playfield of said game and intended to be operated by player manipulation of one or more pinballs.

9. The method according to claim 8 wherein said initializing step occurs each time a playfield switch is actuated.

10. The method according to claim 8 wherein said altering step alters the representative values for all switches each time a new ball is put into play.

* * * * *